US009224100B1

(12) United States Patent
Chatterjee et al.

(10) Patent No.: US 9,224,100 B1
(45) Date of Patent: Dec. 29, 2015

(54) METHOD AND APPARATUS USING ACCELEROMETER DATA TO SERVE BETTER ADS

(75) Inventors: Surojit Chatterjee, Fremont, CA (US); Alex Gawley, Palo Alto, CA (US); Chrix Erik Finne, San Francisco, CA (US)

(73) Assignee: Google Inc., Mountain View, CA (US)

( * ) Notice: Subject to any disclaimer, the term of this patent is extended or adjusted under 35 U.S.C. 154(b) by 483 days.

(21) Appl. No.: 13/245,495

(22) Filed: Sep. 26, 2011

(51) Int. Cl.
*G06N 99/00* (2010.01)

(52) U.S. Cl.
CPC .................................. *G06N 99/005* (2013.01)

(58) Field of Classification Search
CPC .... G06N 99/005; G06K 9/6256; G06Q 10/10
USPC ...................................................... 706/12, 62
See application file for complete search history.

(56) References Cited

U.S. PATENT DOCUMENTS

| 8,165,915 B1* | 4/2012 | Lucash ....................... 705/14.72 |
| 2005/0197977 A1* | 9/2005 | Buck et al. ....................... 706/12 |
| 2006/0017692 A1* | 1/2006 | Wehrenberg et al. ......... 345/156 |
| 2010/0013778 A1* | 1/2010 | Liu et al. ....................... 345/173 |
| 2011/0237230 A1* | 9/2011 | Li et al. ....................... 455/414.1 |
| 2011/0276401 A1* | 11/2011 | Knowles et al. ........... 705/14.58 |
| 2012/0011559 A1* | 1/2012 | Miettinen et al. ................. 726/1 |
| 2012/0066199 A1* | 3/2012 | Ramer et al. ................... 707/709 |
| 2012/0239173 A1* | 9/2012 | Laikari et al. .................... 700/91 |
| 2012/0259578 A1* | 10/2012 | Bevilacqua et al. .......... 702/141 |
| 2012/0262610 A1* | 10/2012 | Rissa et al. ...................... 348/273 |
| 2013/0132566 A1* | 5/2013 | Olsen et al. ................... 709/224 |
| 2013/0181951 A1* | 7/2013 | Klinghult et al. ............. 345/177 |

OTHER PUBLICATIONS

Kawahara et al, "A Context-Aware Content Delivery Service Using Off-the-shelf Sensors", In Proceedings of The Second International Conference on Mobile Systems, Applications, and Services (Mobisys 2004), (Poster Presentation), Boston, U.S.A., Jun. 2004.*
Ofstad et al, "AAMPL: Accelerometer Augmented Mobile Phone Localization", MELT'08, Sep. 19, 2008, San Francisco, California, USA.*
Jennifer R. Kwapisz, et al. "Activity Recognition Using Cell Phone Accelerometers", Dept. of Computer and Information Science, Fordham University, Bronx, NY, KDD 2010—Jul. 25, 2010.

* cited by examiner

*Primary Examiner* — Jeffrey A Gaffin
*Assistant Examiner* — Ilya Traktovenko
(74) *Attorney, Agent, or Firm* — Fish & Richardson P.C.

(57) ABSTRACT

A mobile device, including an accelerometer and a processing unit receiving signals from the accelerometer and determining motion information of the mobile device based on the received signals is disclosed. A content selector selects a media format for content based on the physical state of the mobile device as indicated by the signals from the accelerometer. A display device displays the content in the selected media format. When the motion is a predetermined type of motion, the received content is withheld from being displayed by the display device. A machine learning apparatus is provided as the content selector.

31 Claims, 21 Drawing Sheets

FIG. 6

Patterns Table

| User Position (experiment) | User Motion and Direction (experiment) | User/Device Location | Environment | Screen Size | Advertising Type (may be predicted) | Ad Format (may be predicted) | User Action (may be predicted) |
|---|---|---|---|---|---|---|---|
| Standing | Device not in user possession | urban | Search | smartphone | vertical market | text | view/impression |
| | stationary | shopping district | Display | tablet | horizontal market | image | click-through |
| | dropped/in pocket | landmark | Application | music player | large business | video | purchase/download/conversion |
| Sitting | walking | city/town | | | small business | audio | NONE |
| | jogging | home | | | tier of customer | combination | |
| | in automobile | | | | NONE | NONE | |
| Lying Down | in train | | | | | | |
| | in boat | | | | | | |

FIG. 7

| User Position | User Motion | Device Location | Environment | Advertising Type | Ad Format | User Action |
|---|---|---|---|---|---|---|
|  |  |  |  |  |  |  |

FIG. 8a | Device_ID | Display_Size | Audio |

FIG. 8b | Device_ID | Sequence_ID | User_Position |

FIG. 8c | Device_ID | Sequence_ID | User_Motion |

FIG. 8d | Device_ID | Sequence_ID | Device_Location |

FIG. 8e | Device_ID | Sequence_ID | Environment |

FIG. 8f | Device_ID | Sequence_ID | Advertising_Type |

FIG. 8g | Device_ID | Sequence_ID | Ad_Format |

FIG. 8h | Device_ID | Sequence_ID | User_Action |

FIG. 9

Rules:

If (user_position = sitting) AND (user_motion = in_automobile) AND (location = urban)
Then retrieve ads (location)

If (user_position = lying_down) AND (user_motion = stationary)
Then retrieve game (click_through_rate)

If (user_position = standing) AND (user_motion = walking) AND (location = urban)
Then retrieve ads (location)

If (user_position = standing) AND (user_motion = stationary) AND (environment = display)
Then retrieve ads (passive)

If (user_position = standing) AND (user_motion = walking) AND (environment = search)
Then retrieve ads (passive)

If (user_position = sitting) AND (environment = search)
Then retrieve ads (interactive)

If (user_position = lying_down) AND (environment = application)
Then retrieve ads (interactive)

If (user_motion = none)
Then retrieve ads (none)

If (user_motion = in_pocket)
Then retrieve ads (none)

METHOD AND APPARATUS USING ACCELEROMETER DATA TO SERVE BETTER ADS

BACKGROUND OF THE INVENTION

The inventive field relates to using an accelerometer that is included with many mobile devices to serve virtual content, including advertisements, which may be appropriate for a user of the mobile device.

Accelerometers that are being incorporated into mobile devices are capable of providing signals that can indicate the orientation of the mobile device relative to the Earth and motion of the device in three directions. Users of mobile devices perform actions such as browsing and/or viewing displayed images and text, or listening to music, spoken books or radio programming. Other actions include searching for a particular topic or Web Site using a search engine, and interacting with a mobile device application.

Mobile devices may also be capable of providing information that indicates a user location, such as producing signals by way of a GPS (Global Positioning System) function built into the mobile device. In addition, mobile devices are characterized by the size and resolution of their display screen. Mobile devices having an internal processor are characterized by their operating system. Mobile devices may further be characterized by their communications network technology.

BRIEF SUMMARY

A mobile device, having an accelerometer, a processing unit receiving signals from the accelerometer and determining physical state information of the mobile device based on the received signals. The mobile device having a communications unit transmitting, together with a request for content, the physical state information to a content selector. A processing unit receiving content in a media format selected by the content selector based on the physical state of the mobile device as indicated by the signals from the accelerometer, and a display device displaying the content in the selected media format. The physical state information includes motion, and when the motion is a predetermined type of motion, the content is withheld from being displayed by the display device.

A further aspect of the mobile device, wherein the content media format is selected from one of text, image, photo, animation, video, audio, and combined video and audio.

A further aspect of the mobile device, wherein the predetermined type of motion is stationary.

A further aspect of the mobile device, wherein the predetermined type of motion is vibration.

A further aspect of the mobile device, wherein said determining physical state information includes determining physical orientation information of the mobile device by calculating a change in angles based on the acceleration signals in three dimensions.

A further aspect of the mobile device, further including a processing unit estimating a position of a user holding the mobile device based on the orientation of the mobile device, wherein the physical state information of the mobile device includes the user position.

A further aspect of the mobile device, wherein the motion of the mobile device is determined based on the acceleration signals in three dimensions.

A further aspect of the mobile device, further comprising a location receiver unit obtaining location of the portable device, wherein said physical state information of the mobile device includes the location of the portable device.

A further aspect of the mobile device, further including data storage system storing in a correspondence database sets of estimated user positions and respective content format, wherein said content selector includes a machine learning apparatus, wherein the stored sets are input to the machine learning apparatus and the machine learning apparatus is iteratively trained until a training error is below a predetermined threshold.

A further aspect of the mobile device, wherein the machine learning apparatus is a host processor that operates according to a neural network processor.

A further aspect of the mobile device, wherein the neural network processor is trained in accordance with a backpropagation learning process.

A further aspect of the mobile device, further including data storage system storing in a correspondence database sets of estimated user positions, portable device motion, device location, and respective content format, and a processing unit that induces condition-action rules from the sets.

A further aspect of the mobile device, further including a content selection component, wherein the condition-action rules are processed to receive as input an estimated user position, mobile device motion, and device location obtained within a predetermined time period, and outputs a content format, wherein the content selection component selects content based on the content format.

A further aspect of the mobile device, wherein when the position of the user is determined to be standing, the selected content format is text.

A further aspect of the mobile device, wherein when the position of the user is determined to be lying down, the selected content format is video.

A further aspect of the mobile device, wherein when the motion of the portable device is determined to be higher than a threshold speed, the selected content format is audio.

A further aspect of the mobile device, further comprising: a processing unit receiving content from the machine learning apparatus, a type of the content being selected by the machine learning apparatus based on a physical state of the mobile device, wherein the display device displays the content of the selected type.

A further aspect of the mobile device, wherein the content type is one of vertical market, horizontal market, large business, small business, and tier of customer.

A further aspect of the mobile device, further including a processing unit receiving content from the machine learning apparatus, an action on the content being predicted by the machine learning apparatus based on a physical state of the mobile device, wherein the display device displays the content in accordance with the predicted action.

A further aspect of the mobile device, wherein the action is one of view/impression, click-through, purchase/download/conversion, or no action.

A system having one or more processors, a computer-readable medium coupled to the one or more processors having instructions stored thereon that, when executed by the one or more processors, cause the one or more processors to perform operations including receiving a request for content and acceleration values in three dimensions of a mobile device, estimating a motion of a user holding the mobile device based on the acceleration values of the mobile device, selecting content in a media format determined based on the estimated motion of the user, transmitting the selected content to the mobile device in response to the request for content, wherein when said estimated motion is a predetermined type of motion, content is not selected and transmitted to the mobile device.

A further aspect of the system, wherein the content media format is selected from one of text, image, photo, animation, video, audio, and combined video and audio.

A further aspect of the system, further including a machine learning apparatus; wherein said estimating a motion of a user is performed by the machine learning apparatus.

A further aspect of the system, further comprising a data storage system storing in a correspondence database sets of estimated user positions and respective content format, wherein the stored sets are input to the machine learning apparatus and the machine learning apparatus is iteratively trained until a training error is below a predetermined threshold.

A further aspect of the system, wherein the machine learning apparatus is a host processor that operates according to a neural network processor.

A further aspect of the system, wherein the neural network processor is trained in accordance with a backpropagation learning process.

A further aspect of the system, further including data storage system storing in a correspondence database sets of estimated user positions, portable device motion, device location, and respective content format, and said estimating a motion of a user is performed using condition-action rules determined from the sets.

A further aspect of the system, wherein the condition-action rules receive as input an estimated user position, mobile device motion, and device location obtained within a predetermined time period.

A further aspect of the system, wherein when the motion of the user is determined to be standing, the selected content format is text.

A further aspect of the system, wherein when the motion of the user is determined to be lying down, the selected content format is video.

A further aspect of the system, wherein when the motion of the portable device is determined to be higher than a threshold speed, the selected content format is audio.

A further aspect of the system, wherein the machine learning apparatus predicts an action based on the acceleration values of the mobile device.

A further aspect of the system, wherein the action is one of view/impression, click-through, purchase/download/conversion, or no action.

A further aspect of the system, wherein said selecting content includes ranking content by filtering content having a predetermined user motion.

A further aspect of the system, wherein said selecting content includes ranking content by determining a relevance for content based on correlation history between device location, device orientation and user motion and acceleration values of the mobile device.

These and other aspects are described in detail with respect to the drawings.

BRIEF DESCRIPTION OF THE DRAWINGS

The accompanying drawings constitute part of this specification. In the drawings,
FIG. 6 is a table of example data values for parameters;
FIG. 7 illustrates fields for data collection;
FIGS. 8a-8h illustrate tables for a database system for maintaining collected data;
FIG. 9 shows example rules that may be inferred from data collected for the parameters.

DETAILED DESCRIPTION

The following description refers to the accompanying drawings. The following description is not intended to limit the scope. Instead, the scope is defined by the appended claims.

Mobile devices, methods performed with the mobile devices, and systems including the mobile devices are disclosed, in which the mobile devices incorporate a multi-axis accelerometer are described.

There are situations where a mobile device is performing a function, such as processing a mobile application (mobile app), but it would not be appropriate to show an ad, or show certain types of ads. There are situations where it would not be safe to show an ad to a user. There are situations where it would not be necessary to show an ad to a user, for example, because the mobile device is not being used by the user.

Embodiments of the mobile devices that incorporate a multi-axis accelerometer can include, for example, a laptop computer, a tablet PC, a personal digital assistant (PDA), a personal communicator, a cellular phone, and a portable multimedia player. For purposes of description, the term "mobile device" will be used to refer to any mobile device that includes a multi-axis accelerometer. As will be discussed further below, a multi-axis accelerometer detects acceleration in three directions, which signals can be used to determine a movement or acceleration vector. In addition, the acceleration signals provided by the accelerometer provide data for determining an orientation vector relative to an orientation vector of the earth. Subsequently, accelerometers are used to provide data on the orientation and acceleration/movement of a mobile device.

Mobile devices having accelerometers can operate in a wireless communications network. The wireless communications network can be connected to other network devices through the Internet. Networks by which ads or messages are transmitted in accordance with signals provided by the accelerometer of a mobile device can be of various types. Networks described are provided as examples for purposes of explanation, but are not intended to be limiting.

Figure 1:
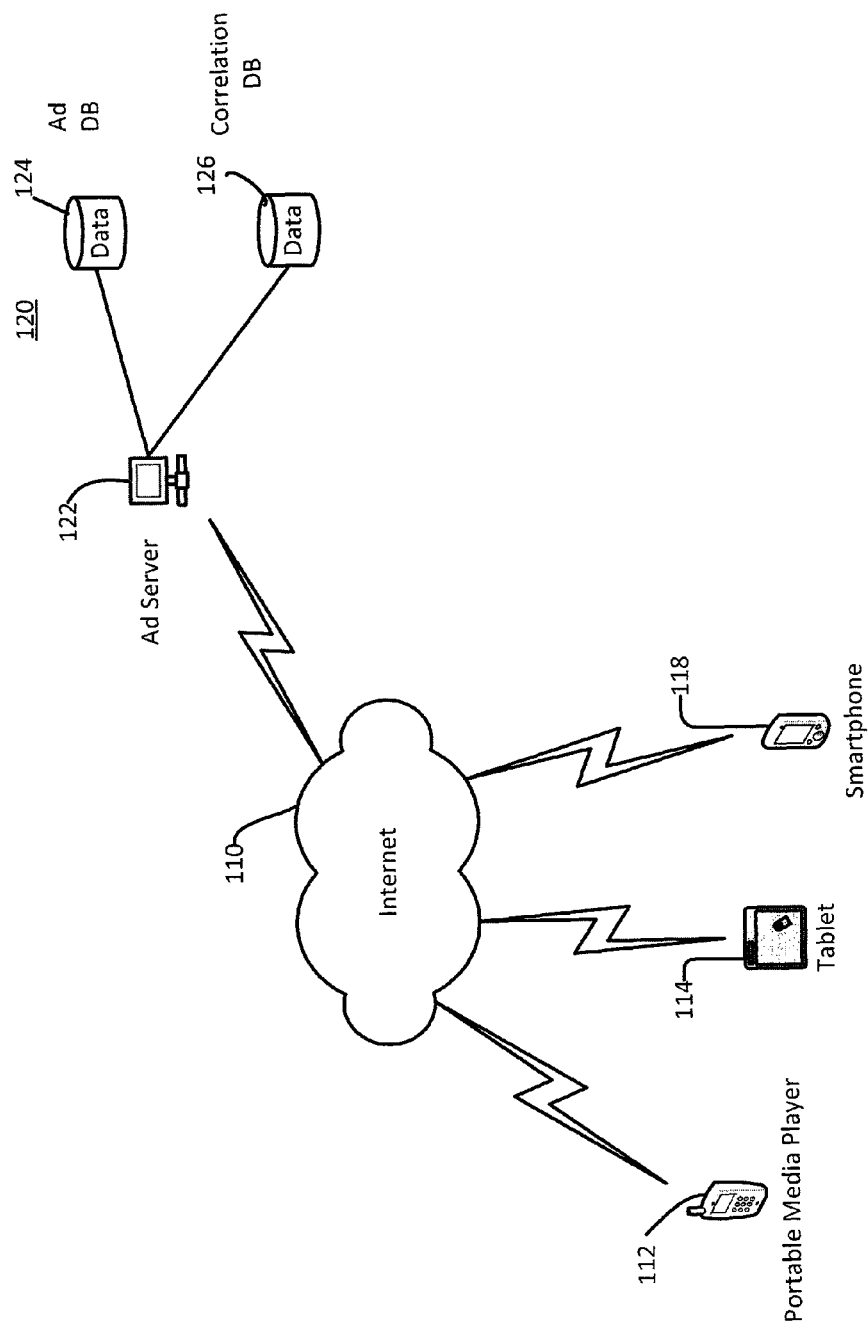
FIG. 1 is an example network configuration.

FIG. 1 shows an example network system. Mobile communications devices are provided with necessary processing and communications interfaces that enable them to communicate directly with other devices, and over different types of networks. For example, a smartphone can be provided with interfaces necessary for Bluetooth communications, WiFi communications, and cellular communications wirelessly, and can be directly connected to other devices by way of a USB port. As shown in FIG. 1, a smartphone 118 can communicate over a WiFi network to connect to the Internet 110. Alternatively, a smartphone 118 can communicate via a cellular network to the Internet 110. Tablet computers can have similar communication features as the smartphones. FIG. 1 shows communications networks that can be accessed by the tablet 114. In addition, portable media players, such as portable media player 112 may be capable of communication by way of a WiFi network.

For purposes of this disclosure, a cellular network can refer to widely used network technologies such as CDMA (Code Division Multiple Access) and GSM (Global System for Portable). Mobile devices are configured for communications over one of the cellular network technologies. For purposes of this disclosure, a mobile device is capable of communications over at least one type of wireless network. Also, although Bluetooth technology may be used for data transmission between devices, for purposes of transmission of signals provided by an accelerometer, types of wireless networks include as a minimum a capability of communicating over a local wireless network such as WiFi (defined by IEEE 802.11 standards).

A minimum configuration for purposes of the disclosed invention is a mobile device that includes a multi-axis accelerometer, and that can communicate with an ad server to obtain ads. An ad server 122 may perform processing to select ads based on data received from the mobile device. It is possible, however, that a mobile device having an accelerometer can perform processing to select ads that would be relevant to the user based on data obtained from the mobile device, where a set of one or more ads are provided by an ad server.

Embodiments of the disclosed invention include the ad server 122, which can collect data provided by mobile devices and can provide ads obtained from an Ad database system 124 that are selected based on data obtained from a mobile device 112, 114, 118. Data collected from mobile devices 112, 114, 118 is stored in a correlation database system 126.

As will be discussed later, the ad server 122 may also maintain and process machine learning models. In other embodiments, processing and maintenance of a machine learning model is performed in the mobile device. In the former case, the ad server collects data from mobile devices that it receives data from, and maintains and processes machine learning models that represent an overall model of users of mobile devices' behavior. In the latter case, the machine learning model performed in the user's mobile device represents a model of the user's own behavior.

The user can be provided with an option of allowing data obtained from the mobile device including user actions to be collected by the ad server, and enabling data obtained from the mobile device including user actions to be stored locally in the mobile device and used to generate a machine learning model of the user's action. As a further option, the user can elect to allow collection of data from the mobile device, but only after it has been anonymized to protect individual users, through for example, removal of personally identifying information, demographic aggregation of data, anonymization of user identifiers and/or device identifiers, and the like. The user election procedure can be in the form of an opt-out policy. For example, a clickable link or "opt-out button" may be included to notify the user that the recipient wishes to not allow data obtained from the mobile device to be collected. As an alternative, the user election procedure can be in the form of an opt-in policy.

Figure 2:
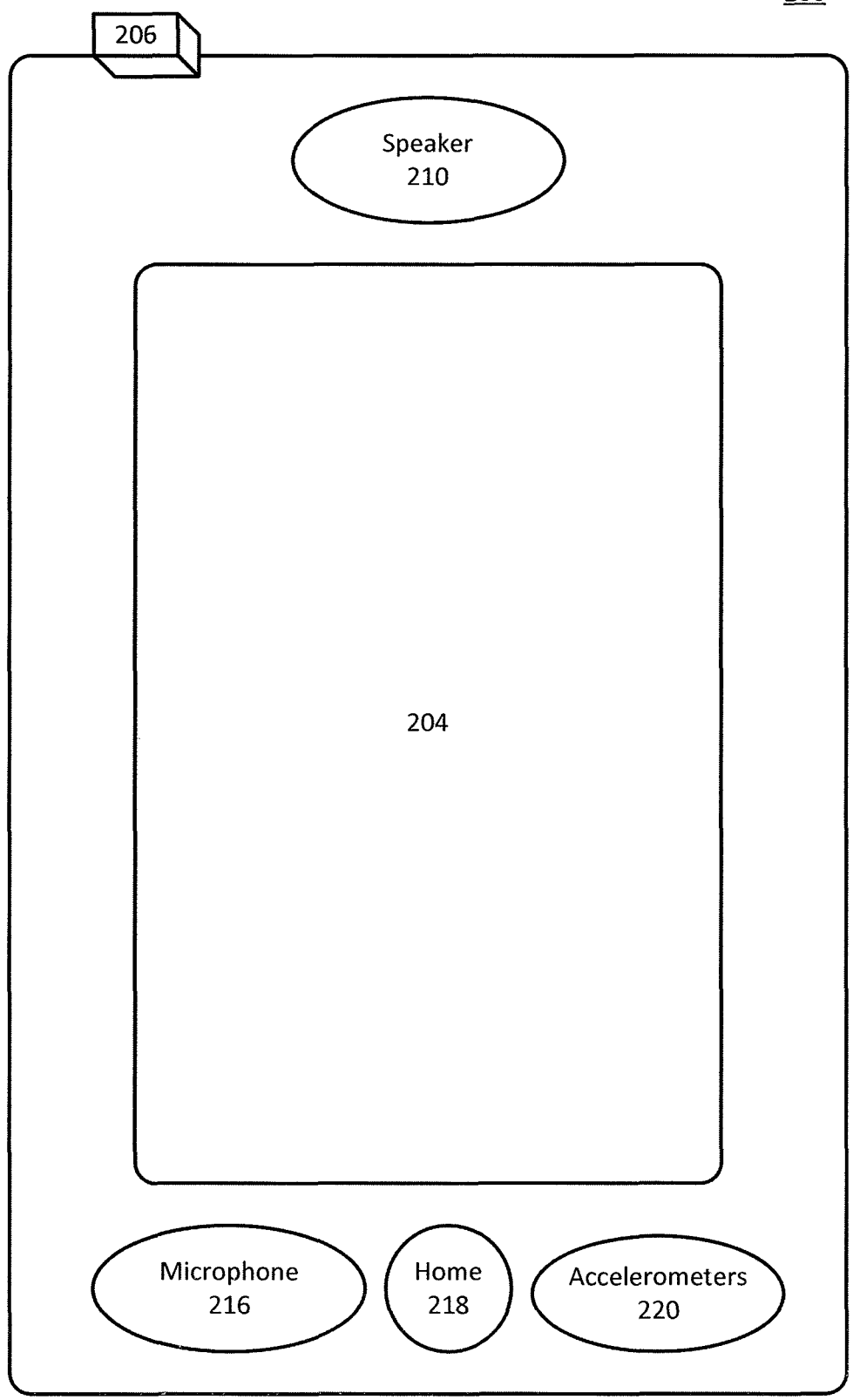
FIG. 2 is an example mobile device.

FIG. 2 shows an example of a smartphone 200 (FIG. 1, smartphone 118). A smartphone 200 is a multifunction device that can include a speaker 210 and microphone 216 for voice communication, as well as for outputting audio sounds. The smartphone 200 can include a multi-touch screen 204, which is for displaying images, graphics, video, and text, and by which a user can make selections or manipulate the display by touching and/or making gestures on the screen. The smartphone 200 includes one or more accelerometers 220.

The multi-touch screen 204 can display a menu of applications that are available for operation on the smartphone 200, a search interface for searching for items such as music, image, video, or files stored in memory of the smartphone, and one or more browsers for display of pages obtained from the Internet. Applications can include games, an e-mail client, calendar application, clock, that are originally provided with the smartphone, or that a user has downloaded from a server. The smartphone 200 may include a physical button 218 that can be used to produce a display of menu items, such as a home screen or a context menu. The smartphone 200 may include a button 206 for turning On/Off power.

The smartphone 200 displays interactive software buttons for initiating applications such as answering a call and expanding a menu of applications. It is understood that software buttons can be implemented a physical buttons on the smartphone casing.

Figure 3:
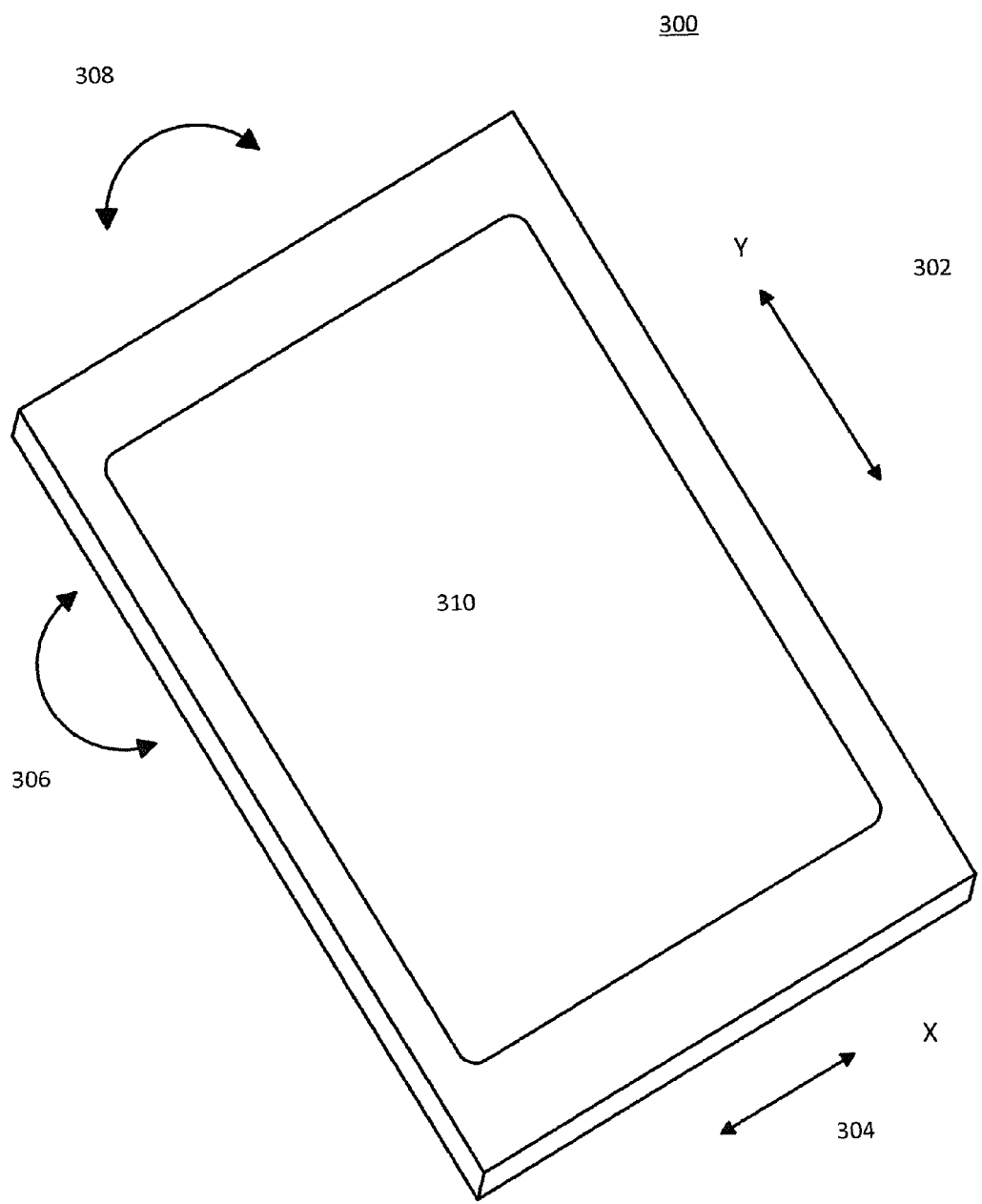
FIG. 3 is an example tablet device.
Figure 4:
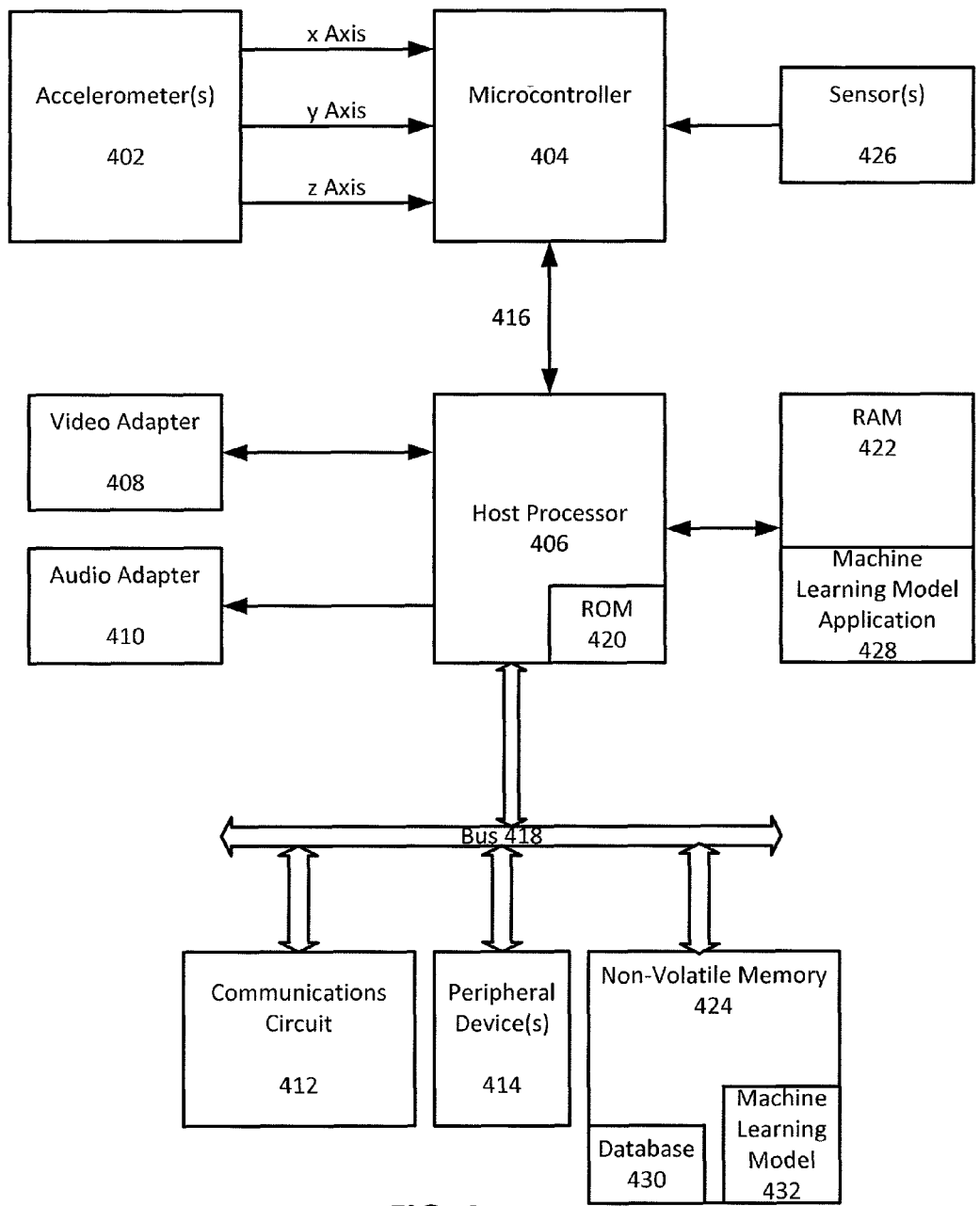
FIG. 4 is an example block diagram of the tablet device.

FIG. 3 illustrates an example of a tablet PC 300 (FIG. 1, tablet PC 36). FIG. 4 is a block diagram for the tablet PC, which incorporates one or more accelerometers 402. The tablet PC includes a microcontroller 404 that is in communication with a host processor 406 by way of a bus 416. The microcontroller 404 performs processing to calculate changes in orientation and motion in three-axes based on signals obtained from the accelerometer 402, as a sensor. The microcontroller 404 also processes signals from other sensors 426, such as a gyroscope, and proximity sensor. The host processor 406 can transmit data to a communications circuit 412, which provides external communication, in particular motion data detected by the accelerometer 402.

In addition, the host processor 406 provides processing for a video adapter 408 and audio device 410. A principal bus 418 provides communications between the host processor 406 and peripheral devices 414.

The host processor 406 works with programs maintained in a ROM 420 and performs processing using a RAM 422. In addition, as will be discussed later, the host processor 406 may have access to applications and data stored in non-volatile memory 424, such as built-in EEPROM, and removable large capacity storage devices, such as microSD, microSDHC, or removable EEPROM devices (connectable through an external bus, such as USB), as types of peripheral devices 414.

As will be described later, among applications that may be processed by the host processor 406 include, a database application for collecting data obtained from the accelerometer, as well as from other sensors, and an application for a machine learning model 428. In an embodiment, the database application can be implemented using SQLite and managed as part of the application for the machine learning model. The non-volatile memory 424 can store the database 430 and a state of the machine learning model 432.

Device Orientation from Accelerometer Signals

Accelerometers provided as a sensor in mobile devices can include multi-axis models that can detect magnitude and direction of the acceleration as a vector quantity. Subsequently, these multi-axis models can be used to sense orientation, acceleration, vibration, and falling. The signals generated by the accelerometer are accessed by a microcontroller, such as microcontroller 404, as a type of sensor signals. Software running on a host processor can obtain these signals using an Application Programming Interface (API).

Figure 5A:
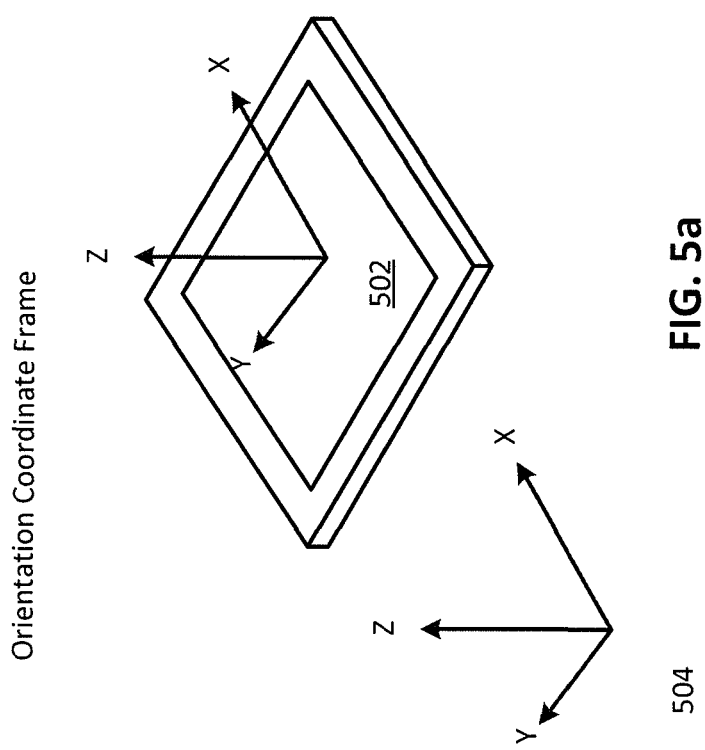
FIG. 5a illustrates a coordinate frame for accelerometer orientation signals.

As an example, the W3C provides a DeviceOrientation API that describes two DOM event types related to a mobile device's physical orientation (DeviceOrientation Event Specification of 24 Aug. 2010). "Device orientation" is defined in terms of a coordinate frame fixed in the mobile device versus a coordinate frame fixed on the Earth, where the mobile device coordinate frame has three axes (defined with respect to the portrait orientation of the display screen). As shown in FIG. 5a, x is in the plane of the screen 502 and is positive towards the right hand side; y is in the plane of the screen 502 and is positive towards the top of the screen; z is perpendicular to the screen 502, positive out of the screen. Three angles alpha, beta and gamma form the angles that characterize the orientation of the screen relative to the Earth coordinate frame 504.

The W3C specification provides a DeviceOrientationEvent which fires whenever a significant change in orientation occurs and provides data about the three angles. An application that incorporates a DeviceOrientationEvent can perform actions based on detection of the event.

Figure 5B:
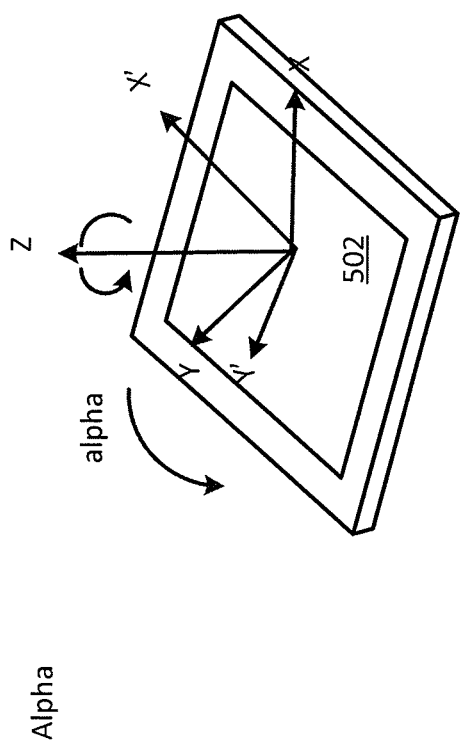
FIG. 5b illustrates a change in orientation about the z-axis by the amount of an angle alpha, referred to as a change in heading.
Figure 5C:
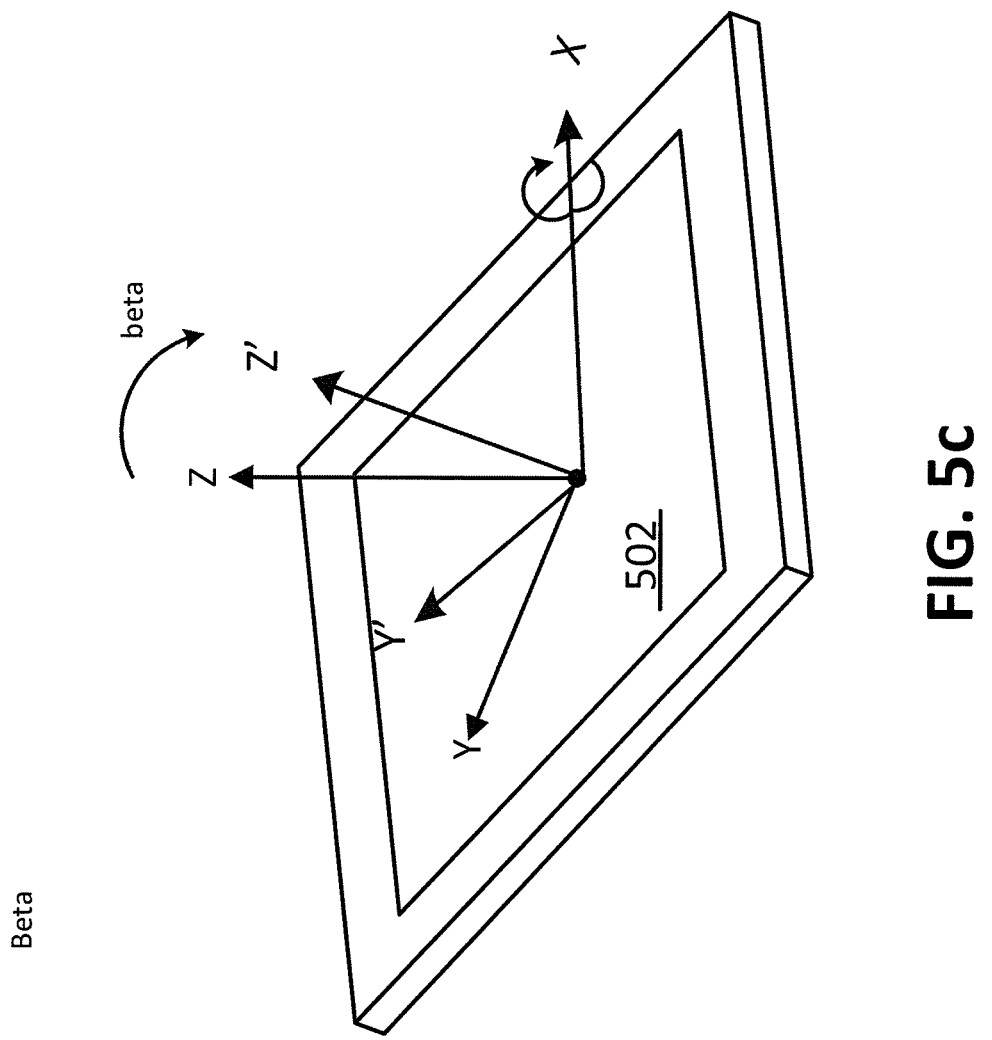
FIG. 5c illustrates a change in orientation about the x-axis by the amount of an angle beta, referred to as a change in pitch.
Figure 5D:
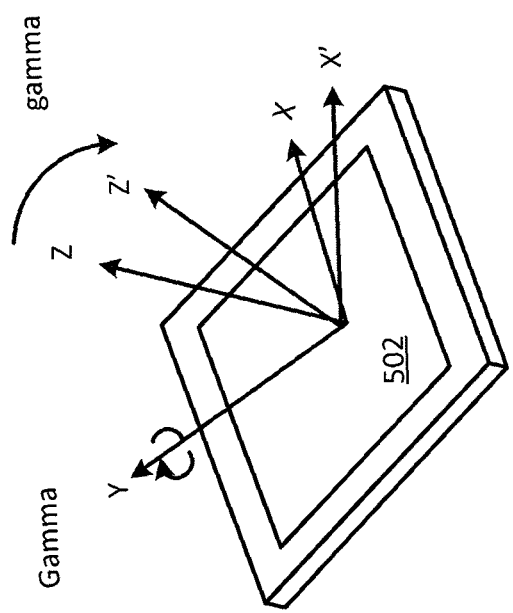
FIG. 5d illustrates a change in orientation about the y-axis by the amount of an angle gamma, referred to as a change in roll.

The three angles are shown in FIGS. 5b, 5c, and 5d. FIG. 5b illustrates a change in position about the z-axis by an amount of an angle alpha. This change in position is referred to as heading, azimuth or yaw. For purposes of this disclosure, the change in position about the z-axis is referred to as heading, having an orientation characterized by the angle alpha. FIG. 5c illustrates a change in position about the x-axis by an amount of an angle beta. This change in position about the x-axis is referred to as pitch. FIG. 5d illustrates a change in position about the y-axis by an amount of an angle gamma. The change in position about the y-axis is referred to as roll. Signals provided by an accelerometer for changes in position by an amount of angles alpha, beta and/or gamma can be used to indicate the orientation of a mobile device.

FIG. 3 illustrates motion that can occur in a tablet PC 300. For example, the tablet PC 300 can be maintained in a planar position, in the x-y plane by a user, and moved in the y-direction 302, or moved in the x-direction 304. The tablet PC 300 may be rotated about the x-axis 308 (pitch) or rotated about the y-axis 306 (roll). Subsequently, movement of the tablet PC by the user is detected by the accelerometer 402, the signals are processed by the microcontroller 404 to determine an orientation vector and movement vector, which is obtained by the host processor 406 for further processing.

Mobile Device Motion from Accelerometer Signals

A multi-axis accelerometer measures acceleration in each of the three axes, and thus measures acceleration and the direction of acceleration. The acceleration in the three directions can be converted to an acceleration vector that indicates acceleration and direction of acceleration of the mobile device. Sudden and short duration acceleration is caused by vibration. Acceleration in a direction toward the Earth and at the acceleration of gravity is caused by a free falling condition.

The W3C specification provides a DeviceMotionEvent that fires at regular intervals, and provides data about acceleration and rotation rate.

Using the DeviceMotionEvent object, an application in a mobile device being held in a moving vehicle can obtain information, for example, about the vehicle traveling speed, as well as that the vehicle is traveling around a curve, or is turning right or left.

Transmission of Accelerometer Data

Data for parameters provided by the accelerometer, including acceleration in each of the x, y, and z direction, change in angle alpha, beta, and gamma, an orientation vector, and an acceleration vector can be transmitted from the mobile device as part of data provided by an application. Data provided by an accelerometer in a mobile device may also be transmitted within HTTP, in the case of a Web browser that supports HTML5.

Correlation—User Position and Mobile Device Orientation

Acceleration data provided by an accelerometer in a mobile device can be collected in conjunction with observations of the position of the user in order to experimentally determine a correlation between user position and the orientation of the mobile device. Collection of data of the position of the user and orientation of the mobile device can be made for an individual user, or for a group of users of different mobile devices.

In particular, experiments can be performed in which orientation of a mobile device can be used to provide an indication of the user's position. For example, signals from an accelerometer including signals associated with the orientation of the mobile device while a user is performing actions can indicate that a user is standing, sitting or lying down. If a user is standing, experiments may show that it is likely that the mobile device is being held substantially at a horizontal orientation. If a user is sitting, experiments may show that it is likely that the mobile device is being held at an angle of about 45 degrees. If a user is lying down, experiments may show that it is likely that the mobile device is being held such that the display screen is facing downward at some angle.

Experimentation has been performed using smartphones as an example mobile device for determining a correlation between the position of a user holding the smartphone, and the orientation of the smartphone. Based on these experiments, the most common orientation for viewing a display screen is when the mobile device is held at a slight angle to the ground. However, when a user is in a sitting position, the angle becomes greater than when a user is standing. The mobile device for the most part is completely flat and stationary when it is laid on a surface and not being held by a user. If a user is sitting down at a point when they first pick up the mobile device, the mobile device may move from horizontal to an angle of, for example, near 45 degrees. If a user is standing at a point when they first pick up the mobile device, the mobile device will generally remain near horizontal, and not move above 45 degrees. If a user is lying down at a point when they first pick up the mobile device, the angle of the mobile device will generally change substantially to anywhere ranging from a vertical orientation to an angle near horizontal, but with the display screen facing down. If a user is in bed, but sitting up, the orientation will be considered as being for a user that is sitting down.

Some mobile device accelerometers are capable of detecting the height above the ground. Additional information about the height of the mobile device above the ground can be used to further indicate whether a user is standing, sitting or lying down.

In addition to information about a relatively stationary orientation of a mobile device, the motion history of the mobile device can be used to indicate a user position. For example, it has been determined through experiment that if the mobile device moves from a stationary horizontal position to a higher position, but still substantially horizontal, the user of the mobile device has likely picked up the mobile device while in a standing position. It has also been determined that if the mobile device moves from the substantially horizontal orientation to an angle close to 45 degrees or higher, it is likely that the user has changed to a sitting position.

Furthermore, it has been determined that if the accelerometer of the mobile device indicates that the mobile device is substantially vertical, but with shaking vibrations, it is likely that the mobile device is only being carried and not being viewed. For example, it may be the case that the mobile device is being carries in a user's pocket.

Once a correlation between user position and mobile device orientation is verified, the data of accelerometer parameters can be used to provide data indicating the position of the user. The determination of the position of the user can be made within the mobile device or can be determined at a server, such as ad server 122 in FIG. 1, based on accelerometer data transmitted to the server.

In an embodiment, the host processor 406 obtains mobile device orientation parameters from the microcontroller 404 and determines a user position based on ranges. In other embodiments, the host processor 406 obtains the mobile device orientation parameters from the microcontroller 404 and transmits the parameter values through the communications circuit 412 to the ad server 22, that estimates the user position based on the parameter values.

Correlation—Acceleration Data and Vehicle Type

In a similar manner experimental data of information about the acceleration of the mobile device in various modes of movement of a user can be collected in order to determine a correlation between mobile device orientation and user motion. Along with motion of a user under his/her own means, information about movement of the mobile device obtained from an accelerometer can be used to indicate a type of vehicle that a user is traveling in. Provided experiments with users performing actions with mobile devices in different modes of transportation, it may be determined, for example, that if a user is sitting in a car, the orientation of the mobile device may be comparable to the user in a sitting position. In addition, it may be determined that velocity signals from the accelerometer are above a predetermined threshold that indicates a moving automobile. It may be determined that if a user is walking, the orientation of the mobile device may be comparable to the user in a standing position. In addition, it may be determined that velocity signals from the accelerometer are above a predetermined threshold that indicates a walking or even a jogging pace. If a user is in a boat, it may be determined that the combination of orientation signals and velocity may indicate a wave-like motion at various speeds. If a user is traveling in a train, it may be determined that the orientation of the mobile device may be comparable to the user in any of a sitting, standing or lying-down position, but at a velocity above a predetermined threshold that indicates the constant steady speed of a train.

The data of accelerometer parameters can be used to provide data indicating the motion of the user. The determination of the motion of the user can be made within the mobile device or can be determined at a server, such as ad server 122 in FIG. 1, based on accelerometer data transmitted to the server.

In an embodiment, the host processor 406 obtains mobile device acceleration parameters from the microcontroller 404 and determines a user position based on ranges. In other embodiments, the host processor 406 obtains the mobile device acceleration parameters from the microcontroller 404 and transmits the parameter values through the communications circuit 412 to the ad server 122, that estimates the user motion based on the parameter values.

Database of Usage Patterns

An aspect of the present invention is the collection of usage patterns that include data obtained from accelerometers. Provided the correlation between mobile device orientation and user position, and the correlation between mobile device acceleration and user motion, data can be collected for a user position, user motion, at a time when a user action is taken on the mobile device. In addition, data on advertising type and ad format, as well as user action can be collected.

FIG. 6 is a table of values for parameters for data collection. Data collected for the parameters provide an indication of patterns of the values. FIG. 7 is a set of fields for data records of values that can be collected. FIGS. 8a to 8h are example fields for database tables. The correlation database system 26 in FIG. 1 can be used to maintain a database of patterns for fields in FIG. 7, in accordance with database tables such as those shown in FIGS. 8a to 8h.

Values for data records in FIG. 7 represent patterns of collected data values. Patterns of values for user position, user motion, location, and environment are useful in predicting a user action, an appropriate advertising type and/or ad media format, or for determining conditions where no ads are displayed. For example, it may be that the data patterns indicate that a video message should not be shown while the user is jogging. Provided relationships indicated by the data patterns, rules may be generated that define conditions for selection of appropriate types of ads from the ads database 124 to be served by the ad server 122.

In an embodiment, a database 430 of data patterns obtained from the mobile device can be maintained locally in a non-volatile memory 424, and may be in combination with a database for other mobile devices that is maintained in a correlation database 126.

Environments for Ads—Search, Display, Application

For purposes of this disclosure, ads can include advertisements of products or services, as well as messages, such as alert messages. Ads from the ads database 124 can be displayed alongside search results. The ads can be selected by the ad server 122 for display based on keywords in the search query. Smartphones that include GPS provide signals indicating location, such that the ad server 122 can select ads based on the location of the smartphone.

Ads can be displayed or provided as audio signals within content provided by a Web publisher. Such ads can be selected by the ad server 122 based on the terms found in the content. A publisher Web page can request an ad as a possible revenue generating source.

Applications for smartphones can be obtained, for example, from an app library. Ads may be displayed or provided as audio signals within the application, or during downloading of an application. Examples of smartphone applications include games, tools, music services, and data services that may be of use to a user of a smartphone.

Correspondence between data related to accelerometer signals, including user position, user motion, location, and ad environment appropriate for the position of the user is set as patterns of usage.

Types of Advertising and Ad Format, Impressions Vs. Click-Through, Conversions

Types of advertising can be categorized by type of business or service being advertised. For example, advertising can be categorized based on the size of the business being advertised. Vertical market advertisements can be used to categorize advertising as being directed to retail businesses or wholesale businesses.

Ad format can include image, photo, animation, video, audio, text, or combination thereof. For purposes of this disclosure, the types of ad format are collectively referred to as ad media format. An audio format may be appropriate in cases where a user cannot or should not look at the display of a mobile device. A still image format or photo format may be appropriate when the user can only quickly glance at a display, or a user can only focus on the display for a short time. A text format may be appropriate in a case where important information needs to be provided to the user and the user is in a position that he/she can sufficiently read the text. A video, video/audio, or animation format may be appropriate where a user is in a relaxed position such that a video will be watched for the duration of the video. Ad media format may include display dimensions. An example smartphone has a display device that can display a width of 320 pixels by a height of 48 pixels. Another example smartphone has a display device that can display 960 by 640 pixels. Tablet PCs have larger display dimensions. The type of advertising and ad format may be dictated by the display dimensions of the mobile device.

Actions that a user may take can be of various degrees. A user can be exposed to an ad displayed along with content on a publisher page, which is typically referred to as an impression. Upon viewing an ad a user can click through to a landing page, which is typically referred to as a click-through action. A user can further perform a purchase, which is typically referred to as a conversion.

Patterns of usage can further take into consideration the type of advertising, ad media format, a user action taken when an ad is provided.

Machine Learning Models

Correlation Between Types of Advertising/Ad Media Format and User Position/Location As noted above, the definition of a user's position based on the orientation of the mobile device can be obtained through experimentation. The resulting definition can be in terms of a range of mobile device orientation signals that constitute each user position.

Similarly, the definition of a user's motion based on acceleration of the mobile device can be obtained through experimentation. The resulting definition can be in terms of a range of mobile device acceleration signals that constitute each user motion.

Provided definitions of user position and user motion, machine learning models can be created for prediction of advertising types, ad formats, and/or user actions, including conditions where no ads are to be displayed. In order to develop machine learning models, data is collected that correlates user information with advertising types, ad media formats and user actions.

In an embodiment, data is collected that correlates a user position, user motion, user location, and advertising type. Data is collected that correlates a user position, user motion, user location, and ad media format. Data is collected that correlates a user position, user motion, user location, and user action. This data can be stored in a local database system maintained in non-volatile memory of the mobile device for the individual user and mobile device, as well as stored in correlation database system 126 for other mobile devices. The database is used to determine patterns of values of user position, user motion, user location, advertising type, ad format, and user action.

Once data is collected for these correlations, machine learning models can be developed. The machine learning models can be used to predict appropriate advertising type, predict appropriate ad media format, predict user action, or predict a combination of advertising type, ad media format, and/or user action for an individual user and mobile device, as well as for many individual users and mobile devices.

Learning rules by induction (Induction): One aspect is a machine learning model that induces rules from the data patterns. Subsequently, a rule-based system can be used to make predictions.

Learning Prediction Functions (linear/non-linear): Another aspect is a machine learning model that learns to predict an action based on an input pattern. An example of a machine learning model that can learn a non-linear relationship between a user's physical state and a user action is the back propagation neural network.

Learning State Transitions (HMM): Another aspect is a machine learning model that learns to predict physical states from past sequences as patterns. For example, if a user changes from a standing position to a sitting position, the machine learning model would represent the temporal transition from standing state to a sitting state. Detection of a temporal transition from standing to sitting may be used to predict a likely user action.

Learning Rules by Induction

Rules that can be applied by the ad server 122 for selection of ads can be derived through induction based on the correlation database 126 of usage patterns. Learning rules by induction requires complete and consistent patterns. An induction machine learning system used in the present invention is an implementation of the C4.5 induction algorithm. FIG. 9 is an example of rules produced using the induction machine learning system provided pattern data collected in the correlation database 126. The induction machine learning system may be operated on the ad server 122, or on a separate computer that is in communication with the ad server 122.

An aspect of the rules generated from the induction machine learning system is that they provide conditions for when not to provide an ad in order to promote user safety. In addition, the condition part of a rule can include a predetermined period of time over which the condition is required. For example, a condition may be that a user in a certain position for a period of time. Another condition may be that the accelerometer does not detect any change in orientation over a period of time, which would indicate that the mobile device is still, such as placed on a table.

Learning a Linear or Non-Linear Relationship Between Patterns and Usage

Another type of machine learning model used in embodiments of the present invention is neural networks. A mutilayer neural network, trained using a learning method such as the backpropagation learning algorithm, is capable of learning both linear and non-linear relationships. FIGS. 10-13 are examples of multilayer neural networks that learn relationships between input patterns of user position, user motion, user location, environment, and corresponding output values for advertising type, ad format, user action, and combination, respectively.

Each node shown in the drawings may represent a plurality of nodes, depending on the values associated with the nodes shown in the drawings. For example, the node for "ad format" in FIG. 11, can be a set of nodes such as "text," "image," "photo," "animation," "video," "audio," for each possible value (FIG. 7 shows a set of values for parameters). When the nodes of the drawings are broken out in this fashion, the data provided for processing in accordance with the neural network may be binary, where "1" indicates that the node is a value in the pattern, while a "0" indicates that the node is not a value in the pattern. For example, if ad format consists of nodes "text," "image," "video," "audio," in this order, a pattern of "1 0 0 0" indicates that the ad format is "text."

Connections between nodes are weighted values that are adjusted through training. A final set of weighted connections for a neural network constitutes a trained neural network model.

In embodiments of the present invention, an individual-based neural network model can be generated locally in the mobile device using data maintained in a local database 430. A program 428 that performs the learning algorithm can be executed in RAM 422 in conjunction with the host processor 406. In an embodiment, the host processor 406 performs the learning algorithm as a background process while the mobile device is powered on. If the device is powered off during performance of learning, the learned weights of the neural network 432 is stored in the non-volatile memory 424. Also, the resulting trained neural network 432 can be stored in the non-volatile memory 424. In other embodiments, a neural network model may be generated in a server, such as ad server 122, using data for a plurality of mobile devices. The resulting neural network model generated in the server would be for a general model of physical states of a mobile device and ads or user actions.

Figure 10:
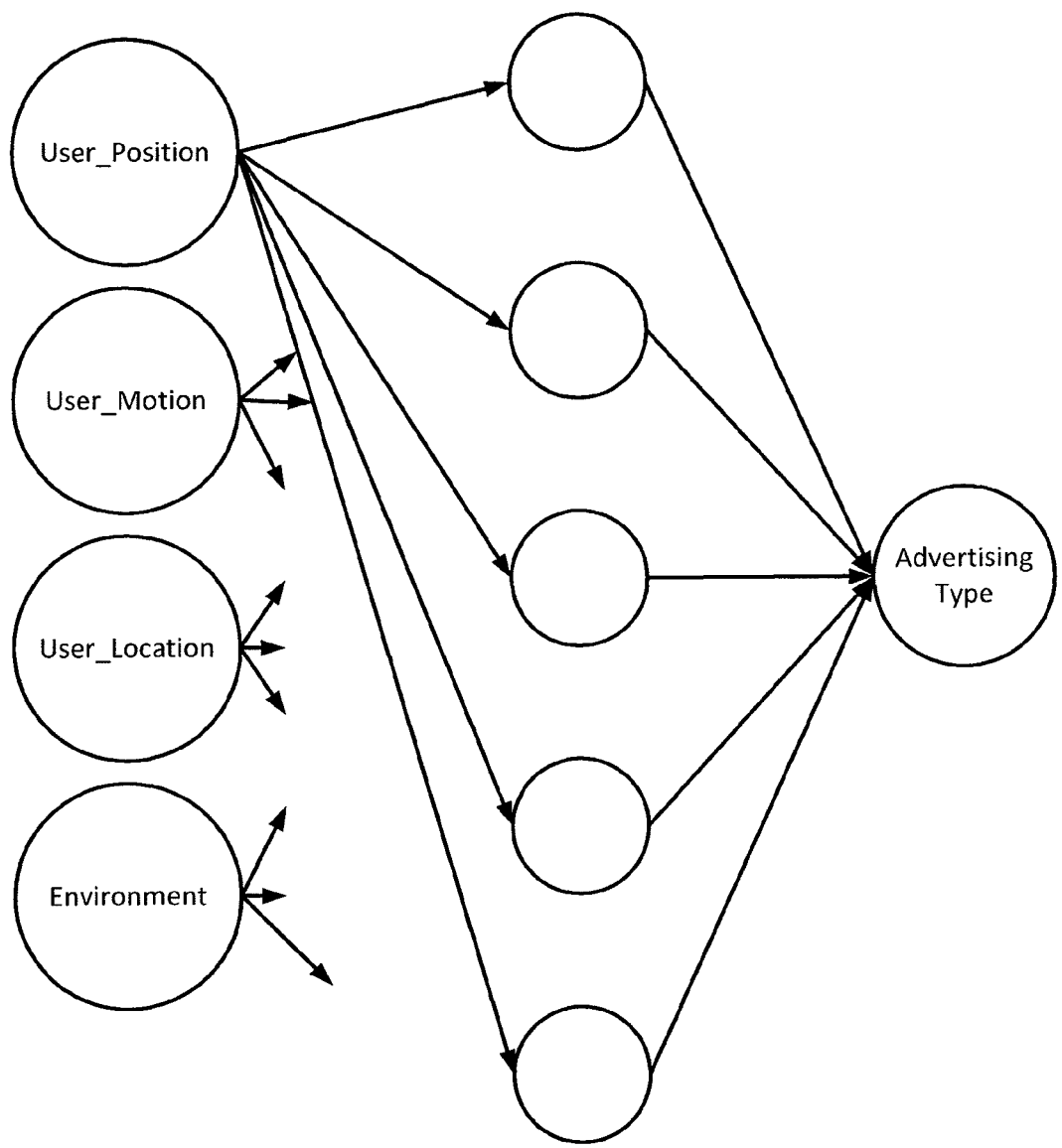
FIG. 10 is an example of a neural network machine learning model having hidden nodes that learns a function between observed values for a user (user_position, user_motion, user_location, environment) and values for advertising_type.
Figure 11:
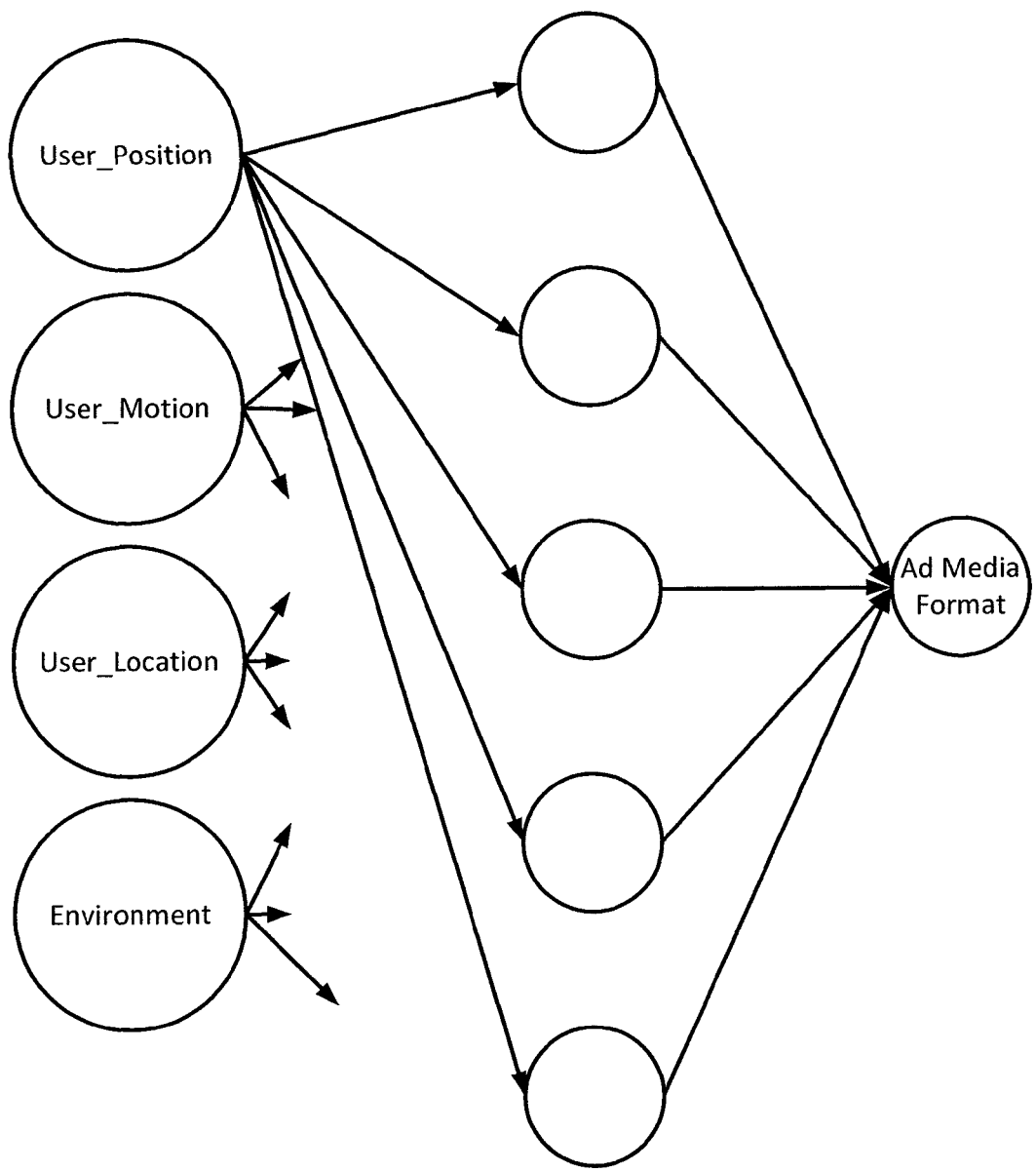
FIG. 11 is an example of a neural network machine learning model having hidden nodes that learns a function between observed values for a user (user_position, user_motion, user_location, environment) and values for ad_format.
Figure 12:
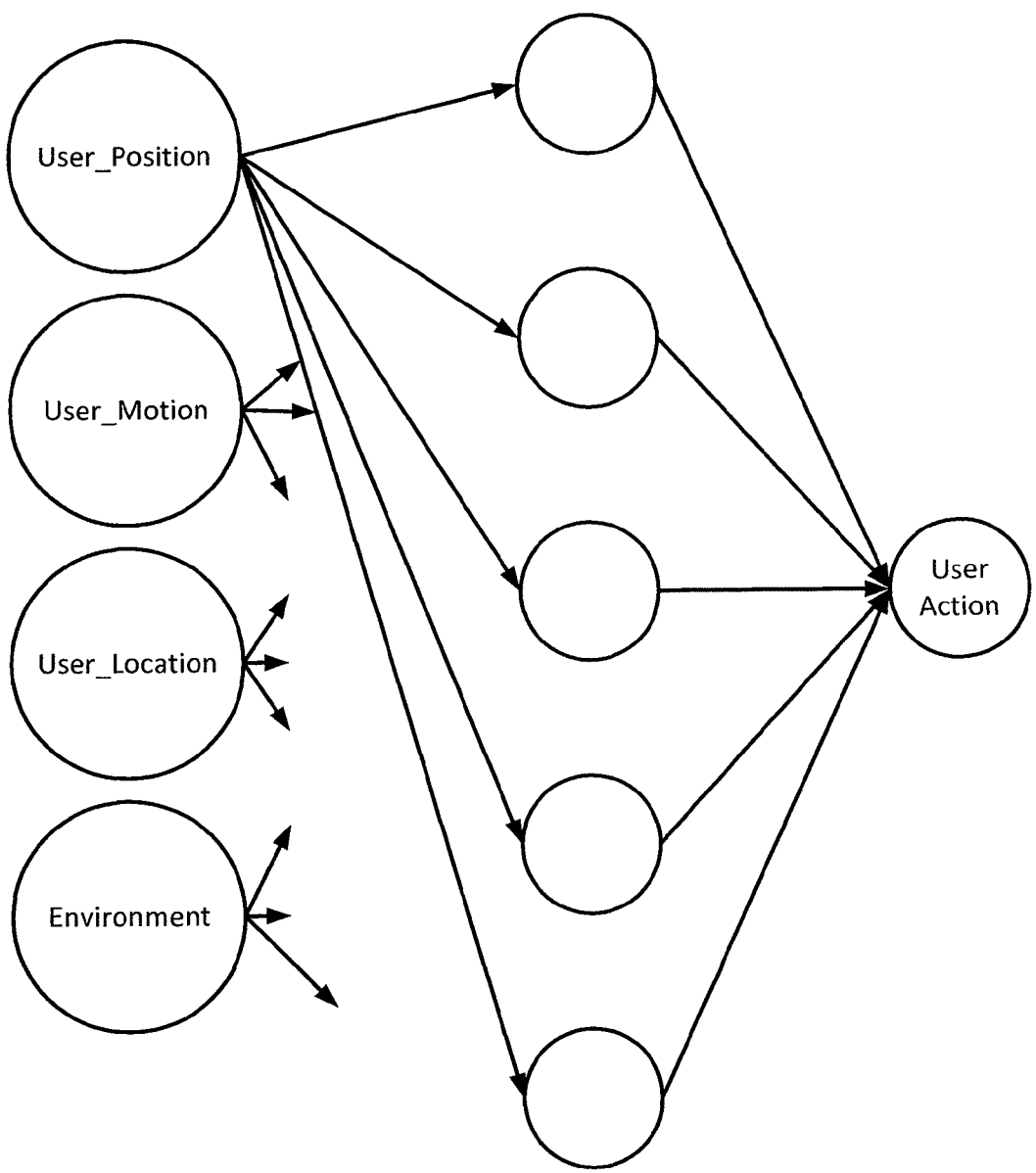
FIG. 12 is an example of a neural network machine learning model having hidden nodes that learns a function between observed values for a user (user_position, user_motion, user_location, environment) and values for user_action.
Figure 13:
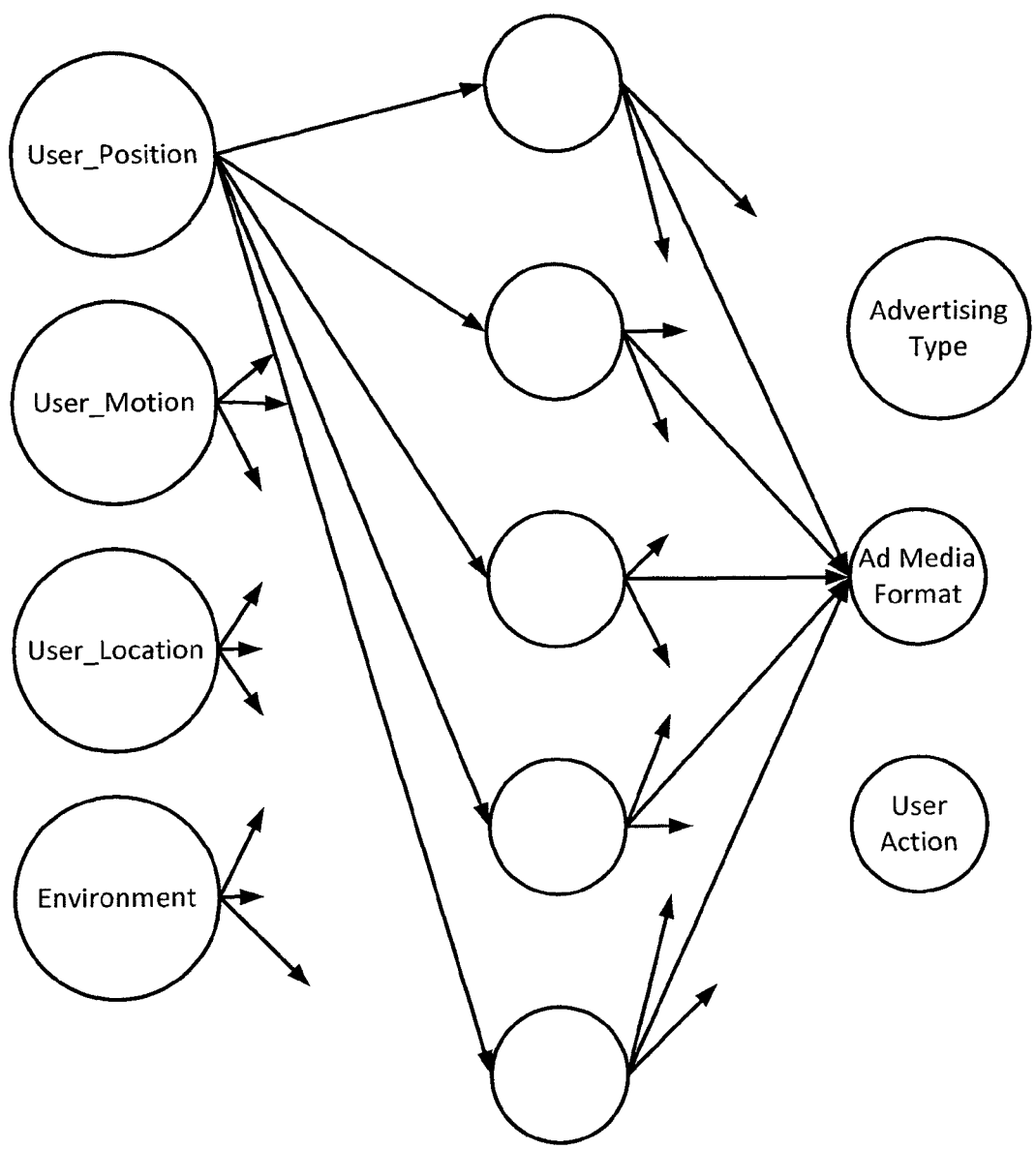
FIG. 13 is an example of a neural network machine learning model having hidden nodes that learns a function between observed values for a user (user_position, user_motion, user_location, environment) and values for each of advertising_type, ad_format, and user_action.

After training with known input patterns obtained from the correlation database 126, a neural network such as the one shown in FIG. 10 can be provided with a new pattern of user position, user motion, user location and environment and quickly provide a prediction of the appropriate advertising type. The neural network of FIG. 11 can provide a prediction of the appropriate ad format. The neural network of FIG. 12 can provide a prediction of the user action. The neural network of FIG. 13 can provide a prediction of each of advertising type, ad format, and user action in combination.

In an embodiment, processing of the neural network is performed locally by a machine learning model application 428 in the mobile device. Advertising type, ad format, and user action predicted by the neural network is sent to the ad server 122 along with other data concerning an ad request. Subsequently, ads provided by ad server 122 are filtered based on advertising type, ad media format, and/or user action predicted by the neural network. In other embodiments, the neural network is performed in the ad server 122, and the ad server uses data obtained from the mobile device to obtain a predicted advertising type, ad media format and/or user action from the neural network model, and use the prediction in selection of ads for transmitting back to the user's mobile device. In a further embodiment, a neural network model application 428 for an individual user processed in the mobile device may be used in conjunction with a neural network model processed in the ad server in serving ads to the user's mobile device.

Learning to Recognize Temporal Patterns

A further aspect of the present invention is a machine learning model that learns temporal patterns. Sequences of accelerometer data over time may indicate movement of a user from one position to another position. Embodiments of the present invention apply Hidden Markov Model (HMM) learning models to predict user action based on changes in user position or changes in user motion. Embodiments of the present invention apply HMM learning models to predict appropriate ad format based on changes in user position or changes in user motion.

Figure 14:
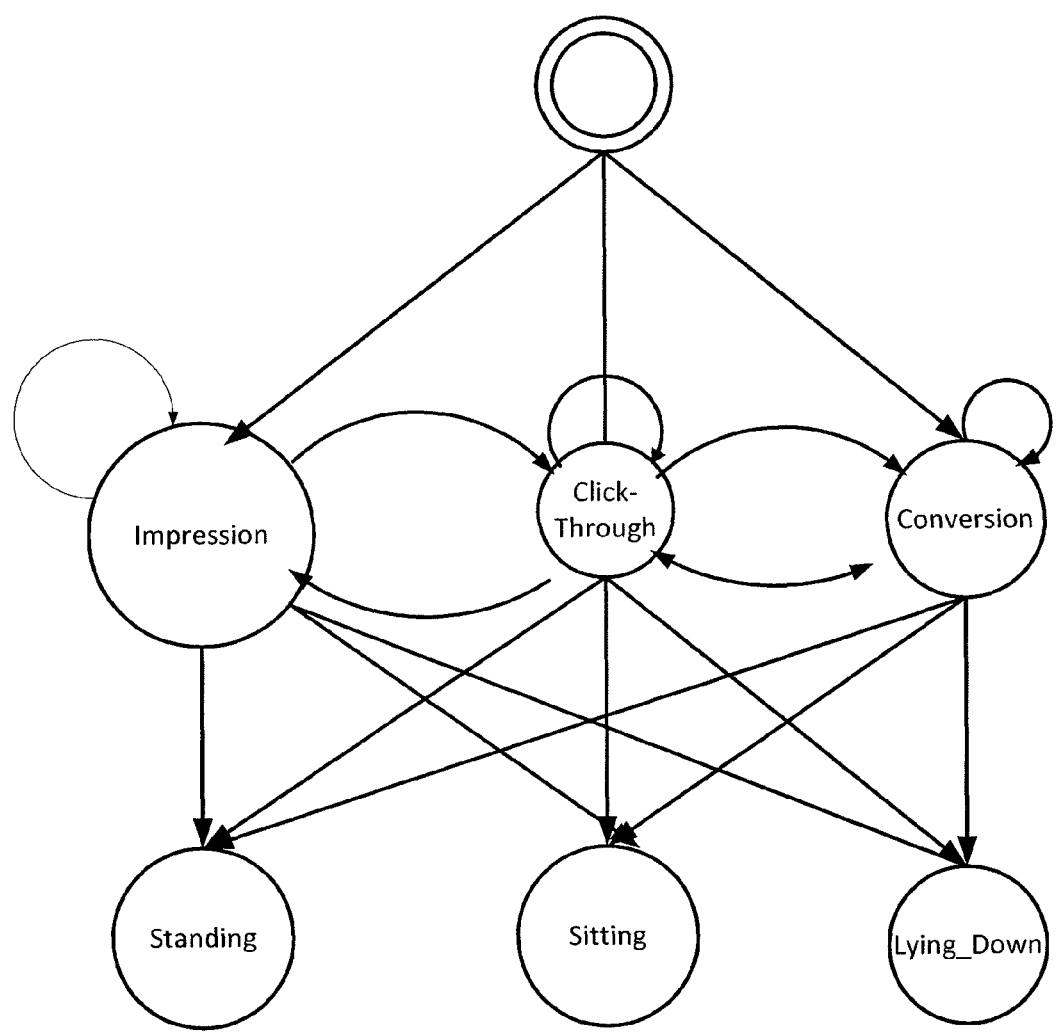
FIG. 14 is an example of a state diagram for a machine learning model that relates an observed data pattern for the parameter user_position to resulting data values for the parameter user_action.

FIG. 14 is an example of a HMM learning model for predicting user action based on changes in user position. Provided accelerometer data that indicates that a user has changed position from lying down to standing, the ad server 122 using the HMM leaning model may select an ad the is intended to obtain impressions. It may be that the HMM learning model has learned that when a user goes from lying down to standing that the user is unlikely to purchase a product or service, but is likely to at least view an ad.

Figure 15:
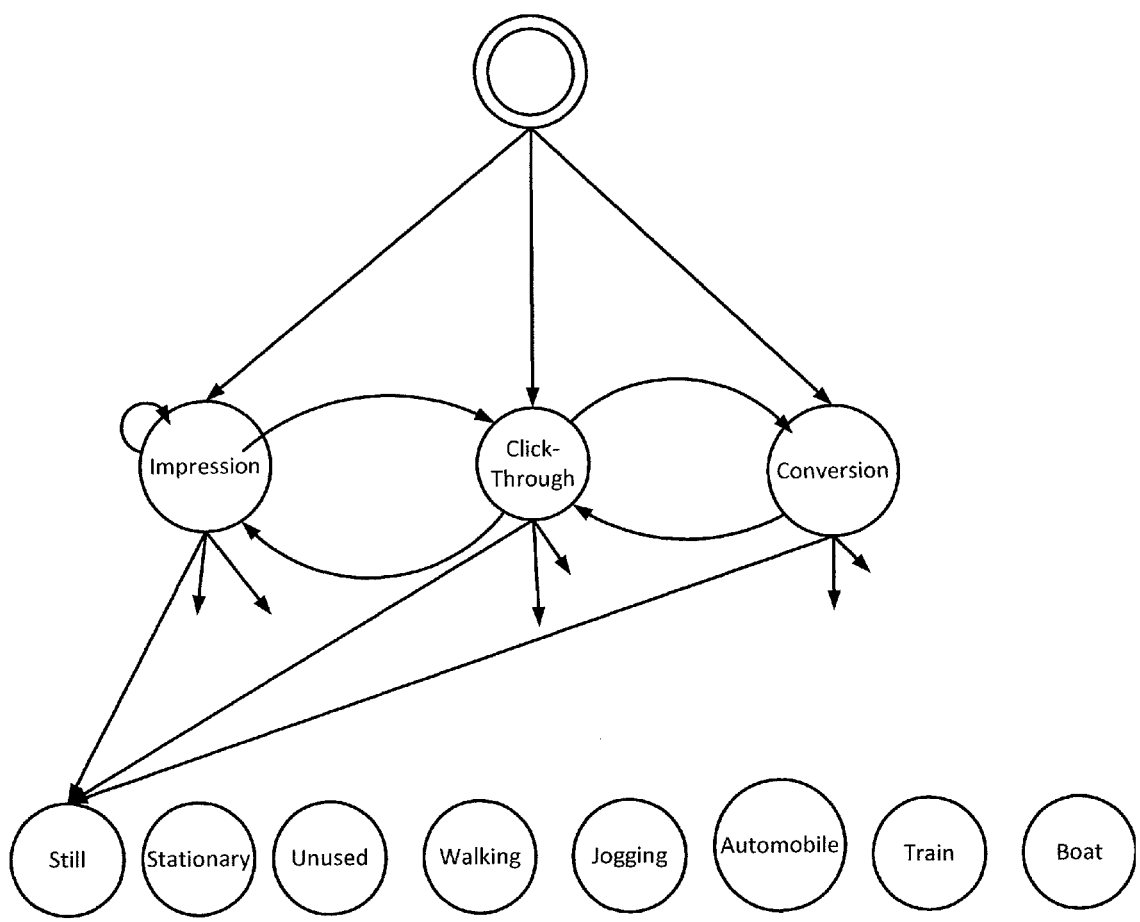
FIG. 15 is an example of a state diagram for a machine learning model that relates an observed data pattern for the parameter user_motion to resulting data values for the parameter user_action.
Figure 16:
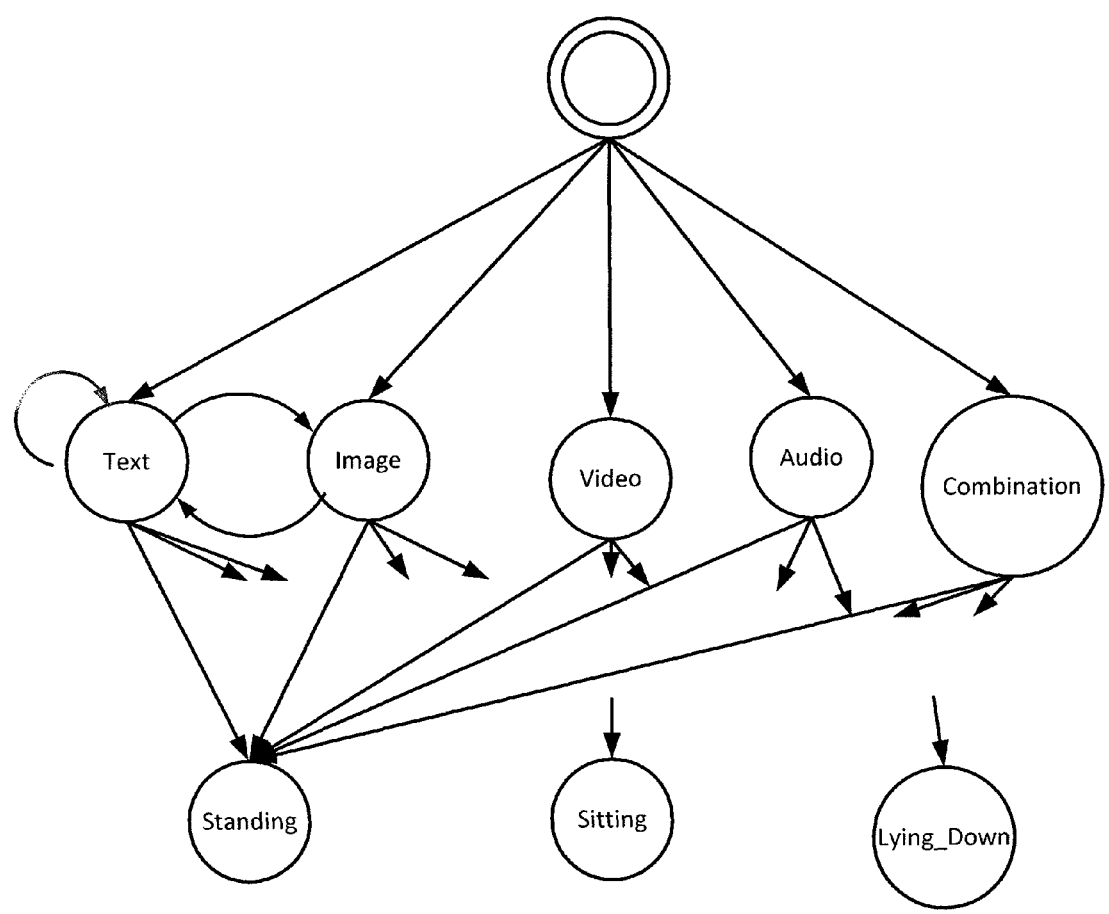
FIG. 16 is an example of a state diagram for a machine learning model that relates an observed data pattern for the parameter user_position to resulting data values for the parameter ad_format.
Figure 17:
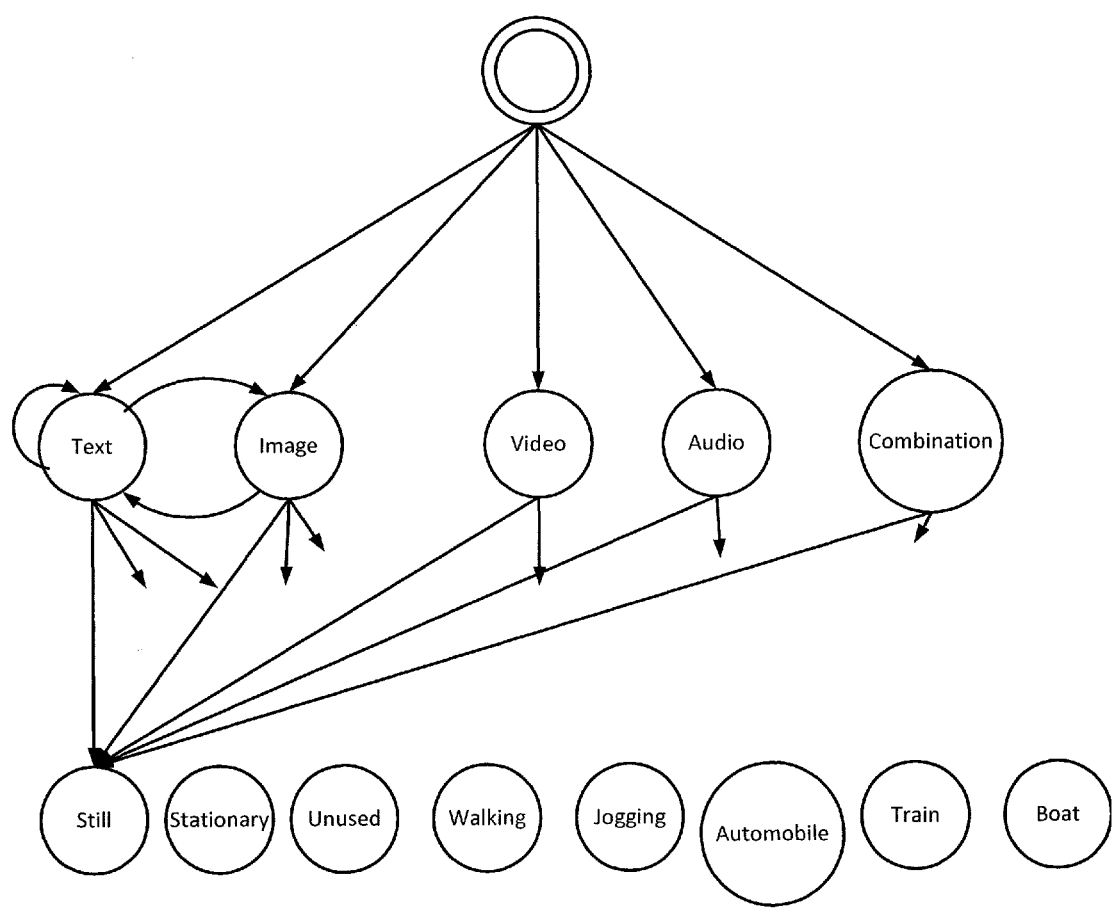
FIG. 17 is an example of a state diagram for a machine learning model that relates an observed data pattern for the parameter user_motion to resulting data values for the parameter ad_format.

FIG. 15 is an example of a HMM learning model for predicting user action based on changes in user motion. FIG. 16 is an example of a HMM learning model for predicting ad media format based on changes in user position. FIG. 17 is an example of a HMM learning model for predicting ad media format based on changes in user motion. Provided accelerometer data that indicates that a user has changed position, the ad server 122 using the HMM learning model will select an ad having an appropriate ad media format.

Mobile Device Ad Request Action (Search, Display, Application)

As previously described, ads can be provided on a mobile device within search results, in the context of a publisher Web page, or in a mobile application. Facilities that can request ads within a search client enable a search provider to integrate advertising into search results.

A mobile device can include a search client that incorporates supplemental code that submits a request for an ad along with a search request. In an example embodiment, the search terms contained in a search request are also included as parameters in a request for an ad. The search provider can pass a targeted ad that contextually matches the search terms. A contextually targeted ad can be returned within the listing of search results. Alternatively, a contextually targeted ad can be displayed separately from the search results, such as in a display region below the search results.

A mobile device can include a browser for display of Web pages, including publisher Web pages. A provider of publisher Web pages can include targeted ads that contextually match the content of the Web page.

A mobile device can include a mechanism for storing and executing mobile applications. In an example embodiment, code that incorporates ads in a mobile application can be downloaded at the time of downloading a mobile application. By incorporating ads into mobile applications, developers of the mobile applications can earn income from ads. Also, it becomes more feasible for an application developer to distribute a free version of an application that is ad supported.

The mobile device can detect the state of an application and display an ad at a timing that is unobtrusive to the user that is performing actions with the application. In an embodiment, an ad will be displayed when the application has reached an end state, such as when a game has finished. Alternatively, an ad may be displayed when the application has reached a transitional state, such as between stages of a game. Ads may also be displayed at the beginning of an application. In the case of audio-type ads, an ad may be played in an audio output instead of displayed on a display device.

Server System

Figure 18:
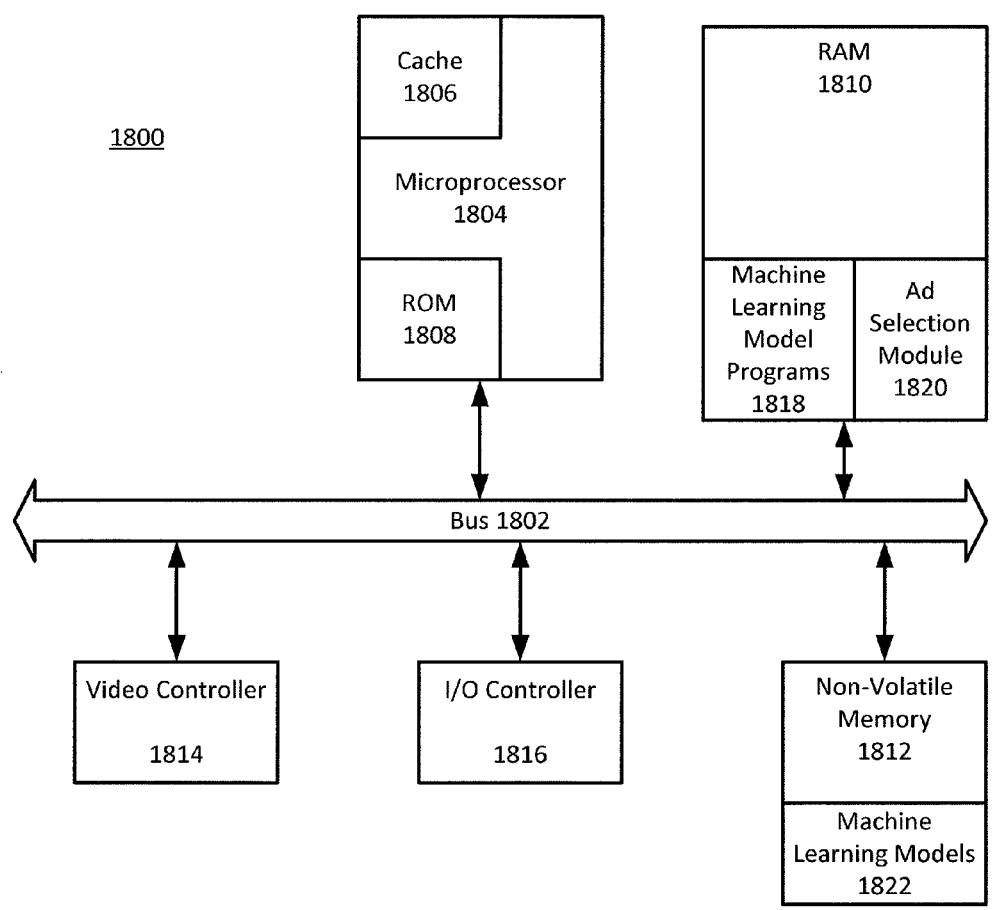
FIG. 18 is a block diagram for a microprocessor-based server computer.

The server system may be implemented in a network. FIG. 18 is a block diagram for a computer this would be connected in the network making up a server system. The machine learning models of embodiments of the present invention may be implemented in an ad server computer 122, or may be implemented in a separate computer or computers. The server system may include a database system for ads 124 and a correlation database system 126, which provides correlation between the data collected from mobile devices, including user position, user motion and direction, and user location, and data regarding ads, including advertising type, ad format, and user action, as in FIG. 7. The server system can also estimate user position from data on mobile device orientation, and estimate user motion from data on mobile device acceleration.

As can be seen in FIG. 18 a server computer 1800 may include a microprocessor 1804 provided with a cache 1806, a read only memory (ROM) 1808, volatile memory (RAM) 1810, and one or more large storage devices (Non-volatile memory) 1812, with the memory devices communicating data over a bus 1802. The server computer 1800 may also include a display device 1814 and I/O devices 1818 that communicate with the microprocessor 1804 by way of display controller and I/O controller 2016 devices.

In the case that the server computer 1800 is an ad server 122, the server computer 1800 includes an ad selection module 1820 for serving ads over a network such as Internet 10. In the case that the server computer 1800 performs machine learning methods, the server computer 1800 includes machine learning model programs 1818 capable of performing any of the machine learning methods of induction, back-propagation neural network, and hidden Markov model. The machine learning programs are processed using the microprocessor 1804. Final values of weights of the machine learning models 1822 are stored in the non-volatile memory 1812.

Ad Correlation

The ad server 122 provides services for collection of data that correlates user position and motion, and user action, and stores the correlated data in a correlation database system 126. The collected data is used to develop machine learning models, as well as to update machine learning models.

Ad Filter

The ad server 122 also provides ad selection and filtering services. The filtering services are based on data collected for user position and user motion which are derived from the accelerometer signals. In particular, the filtering services can provide ads that are appropriate for a user that is walking versus a user that is standing, for example, by providing ads that are of video format or that are still image format.

Computer Implementation

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity;

control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A mobile device, comprising:
    a processing unit receiving acceleration signals and determining physical state information of the mobile device based on the received signals, the determined physical state information including information about motion;
    a communications unit transmitting a request for content;
    a processing unit receiving content at the mobile device, the received content being in a particular media format;
    a processing unit estimating a position of a user holding the mobile device based on the orientation of the mobile device, wherein the information about motion includes the user position; and
    a presentation device presenting the received content in the particular media format, at the mobile device, in response to a determination that the motion is not a predetermined type of motion,
    wherein said information about motion includes physical orientation information of the mobile device determined by calculating a change in angles based on the received acceleration signals in three dimensions, and
    wherein the request for content includes information about motion, and when the position of the user is determined to be standing, the particular media format is text.

2. The mobile device of claim 1, wherein the particular media format includes one of text, image, photo, animation, video, audio, and combined video and audio.

3. The mobile device of claim 1, wherein the predetermined type of motion is stationary.

4. The mobile device of claim 1, wherein the predetermined type of motion is vibration.

5. The mobile device of claim 1, wherein the motion of the mobile device is determined based on the acceleration signals in three dimensions.

6. The mobile device of claim 5, further comprising a location receiver unit obtaining location of the portable device, wherein said physical state information of the mobile device includes the location of the portable device.

7. The mobile device of claim 6, further including data storage system storing in a correspondence database sets of estimated user positions, portable device motion, device location, and respective media format, and a processing unit that induces condition-action rules from the sets.

8. The mobile device of claim 7, further including a content filtering component, wherein the condition-action rules are processed to receive as input an estimated user position, mobile device motion, and device location obtained within a predetermined time period, and outputs a media format, wherein the content filtering component determines whether received content is presented on the presentation device.

9. The mobile device of claim 5, wherein the request for content includes information about motion, and when the motion of the portable device is determined to be higher than a threshold speed, the particular media format is audio.

10. The mobile device of claim 1, further including:
    a data storage system storing in a correspondence database sets of estimated user positions and respective media format, and
    a machine learning apparatus, wherein the stored sets are input to the machine learning apparatus and the machine learning apparatus is iteratively trained until a training error is below a predetermined threshold.

11. The mobile device of claim 10, wherein the machine learning apparatus is a host processor that operates according to a neural network processor.

12. The mobile device of claim 11, wherein the neural network processor is trained in accordance with a backpropagation learning process.

13. The mobile device of claim 1, further comprising:
    a machine learning apparatus that selects a type of content for presentation on the presentation device based on a physical state of the mobile device, wherein the presentation device presents the content of the selected type.

14. The mobile device of claim 13, wherein the content type is one of vertical market, horizontal market, large business, small business, and tier of customer.

15. The mobile device of claim 1, further comprising:
    a machine learning apparatus that predicts an action on the content based on a physical state of the mobile device, wherein the presentation device presents the content in accordance with the predicted action.

16. The mobile device of claim 15, wherein the action is one of view/impression, click-through, purchase/download/conversion, or no action.

17. A mobile device comprising:
    a processing unit receiving acceleration signals and determining physical state information of the mobile device based on the received signals, the determined physical state information including information about motion;
    a communications unit transmitting a request for content;
    a processing unit receiving content at the mobile device, the received content being in a particular media format;
    a processing unit estimating a position of a user holding the mobile device based on the orientation of the mobile device, wherein information about motion includes the user position; and
    a presentation device presenting the received content in the particular media format, at the mobile device, in response to a determination that the motion is not a predetermined type of motion,
    wherein said information about motion includes physical orientation information of the mobile device determined by calculating a change in angles based on the received acceleration signals in three dimensions, and
    wherein the request for content includes information about motion, and when the position of the user is determined to be lying down, the particular media format is video.

18. A system comprising:
    one or more processors;
    a computer-readable medium coupled to the one or more processors having instructions stored thereon that, when executed by the one or more processors, cause the one or more processors to perform operations comprising:

receiving a content request from a mobile device, the content request being associated with acceleration values in three dimensions acquired from the mobile device;

estimating a motion of a user of the mobile device based on the received acceleration values;

providing content in a media format to the mobile device in response to the content request, said providing including selecting content in the media format based on the estimated motion of the user; and transmitting the selected content in the selected media format to the mobile device in response to the content request, wherein said providing is performed in response to the estimated motion not being a predetermined type of motion, and wherein when the motion of the user is determined to be standing, the selected media format is text.

19. The system of claim 18, wherein the content media format is selected from one of text, image, photo, animation, video, audio, and combined video and audio.

20. The system of claim 18, further comprising a machine learning apparatus; wherein said estimating a motion of a user is performed by the machine learning apparatus.

21. The system of claim 20, further comprising a data storage system storing in a correspondence database sets of estimated user positions and respective media format, wherein the stored sets are input to the machine learning apparatus and the machine learning apparatus is iteratively trained until a training error is below a predetermined threshold.

22. The system of claim 20, wherein the machine learning apparatus is a host processor that operates according to a neural network processor.

23. The system of claim 22, wherein the neural network processor is trained in accordance with a backpropagation learning process.

24. The system of claim 18, further including data storage system storing in a correspondence database sets of estimated user positions, portable device motion, device location, and respective media format, and said estimating a motion of a user is performed using condition-action rules determined from the sets.

25. The system of claim 24, wherein the condition-action rules receive as input an estimated user position, mobile device motion, and device location obtained within a predetermined time period.

26. The system of claim 18, wherein when the motion of the portable device is determined to be higher than a threshold speed, the selected media format is audio.

27. The system of claim 18, wherein the machine learning apparatus predicts an action based on the acceleration values of the mobile device.

28. The system of claim 27, wherein the action is one of view/impression, click-through, purchase/download/conversion, or no action.

29. The system of claim 18, wherein said selecting content includes ranking content by filtering content based on the estimated motion.

30. The system of claim 18, wherein said selecting content includes ranking content by determining a relevance for content based on correlation history between device location, device orientation and user motion and acceleration values of the mobile device.

31. A system comprising:

one or more processors;

a computer-readable medium coupled to the one or more processors having instructions stored thereon that, when executed by the one or more processors, cause the one or more processors to perform operations comprising:

receiving a content request from a mobile device, the content request being associated with acceleration values in three dimensions acquired from the mobile device;

estimating a motion of a user of the mobile device based on the received acceleration values;

providing content in a media format to the mobile device in response to the content request, said providing including selecting content in the media format based on the estimated motion of the user; and transmitting the selected content in the selected media format to the mobile device in response to the content request, wherein said providing is performed in response to the estimated motion not being a predetermined type of motion, and wherein when the motion of the user is determined to be lying down, the selected media format is video.

* * * * *